US011182994B2

(12) United States Patent
Funo et al.

(10) Patent No.: US 11,182,994 B2
(45) Date of Patent: Nov. 23, 2021

(54) FACILITY RESERVATION MANAGEMENT SYSTEM THAT CONTROLS FACILITY DEVICES

(71) Applicant: FUJI XEROX CO., LTD., Tokyo (JP)

(72) Inventors: Hiroyuki Funo, Kanagawa (JP); Satoru Tsuto, Kanagawa (JP); Naoyasu Terao, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/913,422

(22) Filed: Jun. 26, 2020

(65) Prior Publication Data

US 2021/0241558 A1 Aug. 5, 2021

(30) Foreign Application Priority Data

Feb. 5, 2020 (JP) .............................. JP2020-017952

(51) Int. Cl.
*G07C 9/25* (2020.01)
*G06Q 10/02* (2012.01)
*G06F 1/28* (2006.01)
*G07C 9/00* (2020.01)

(52) U.S. Cl.
CPC ......... *G07C 9/00904* (2013.01); *G06Q 10/02* (2013.01); *G07C 9/00571* (2013.01); *G07C 9/257* (2020.01); *G06F 1/28* (2013.01)

(58) Field of Classification Search
CPC ................ G07C 9/00904; G07C 9/257; G07C 9/00571; G06Q 10/02; G06F 1/28
See application file for complete search history.

(56) References Cited

U.S. PATENT DOCUMENTS

| 2010/0070314 | A1* | 3/2010 | Jethani | ................. | G06Q 10/109 705/6 |
| 2018/0174076 | A1* | 6/2018 | Fukami | ................ | H04W 12/06 |
| 2019/0213819 | A1* | 7/2019 | Terashima | ........ | G07C 9/00571 |
| 2019/0228348 | A1* | 7/2019 | O'Keefe-Sally | ....... | G06Q 10/02 |
| 2020/0143305 | A1* | 5/2020 | Mund | .................... | G06Q 10/02 |
| 2020/0273272 | A1* | 8/2020 | Takikawa | ........... | G07C 9/00571 |
| 2020/0302344 | A1* | 9/2020 | Just | ......................... | G06F 21/34 |
| 2020/0364011 | A1* | 11/2020 | Funo | ..................... | H04L 63/108 |
| 2020/0410407 | A1* | 12/2020 | Hashimoto | .......... | G06F 16/953 |
| 2021/0097450 | A1* | 4/2021 | Deluca | .................... | H05B 45/20 |
| 2021/0150423 | A1* | 5/2021 | Tomosugi | ............... | G06F 21/44 |

FOREIGN PATENT DOCUMENTS

| JP | H09-128446 A | 5/1997 |
| JP | 2004-086582 A | 3/2004 |

* cited by examiner

*Primary Examiner* — Brian E Miller
(74) *Attorney, Agent, or Firm* — Oliff PLC

(57) ABSTRACT

A system includes an operation receiving unit and an operation control apparatus. The operation receiving unit is operated by a user. The operation control apparatus controls a first device at a facility to enter into an operating state in response to a user operation being performed at the operation receiving unit during a first time period determined by reservation information. The operation control apparatus also controls a second device at the facility to enter into an operating state at a start time associated with the first time period, regardless of presence of a user operation at the operation receiving unit.

20 Claims, 6 Drawing Sheets

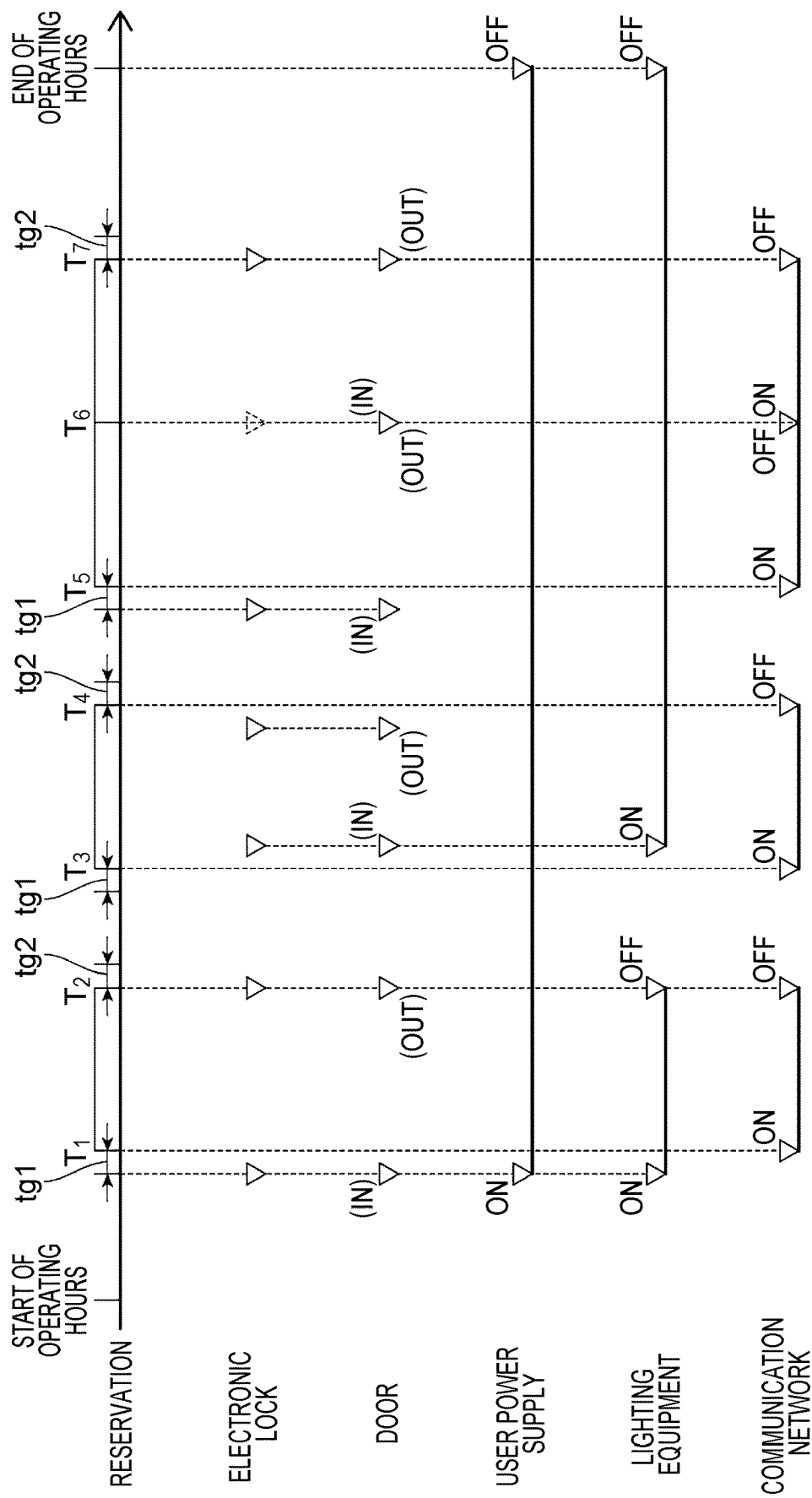

FACILITY RESERVATION MANAGEMENT SYSTEM THAT CONTROLS FACILITY DEVICES

CROSS-REFERENCE TO RELATED APPLICATIONS

This application is based on and claims priority under 35 USC 119 from Japanese Patent Application No. 2020-017952 filed Feb. 5, 2020.

BACKGROUND

(i) Technical Field

The present disclosure relates to a system and a facility.

(ii) Related Art

In a shared facility used by multiple users by reservations, starting and stopping of operating facility devices provided in the shared facility is conducted based on reservation information.

Japanese Unexamined Patent Application Publication No. 9-128446 discloses the following technology. A reservation terminal registers a schedule for the use of a meeting room in a central management apparatus. The schedule is registered at least by including the name of a meeting room, a reservation time, and devices and machines to be used. In each meeting room, a control apparatus is disposed to centrally control environment-adjusting devices and audio-visual machines installed in the meeting room. The control apparatus is constituted by a fixed controller and a commander which gives an instruction to operate the devices and machines by a wireless signal. The controller causes the environment-adjusting devices to start operating so that a reserved meeting room will be in a suitable environment at a reservation time, and also causes units related to the devices and machines described in the schedule to start operating in a series of steps so that the devices and machines can be used at the reservation time.

Japanese Unexamined Patent Application Publication No. 2004-86582 discloses the following technology. A booth for rent, which provides a space to a user for a predetermined time, is connected to a group management center via a communication network. This enables the group management center to centrally control and manage many booths for rent. Services to be provided to a user in a booth are determined by contract with multiple service operators. The group management center manages users' access to the booths and reservation schedules.

SUMMARY

In terms of the convenience and the security, it may be desirable to control facility devices under different conditions depending on the types of devices.

Aspects of non-limiting embodiments of the present disclosure relate to making it possible to enhance the convenience or the security concerning the use of facility devices, which are used by reservations, by controlling the operations of the facility devices under different conditions depending on the types of devices.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a system including an operation receiving unit and an operation control apparatus. The operation receiving unit is operated by a user. The operation control apparatus controls a first device at a facility to enter an operating state in response to a user operation being performed at the operation receiving unit during a first time period determined by reservation information. The operation control apparatus also controls a second device at the facility to enter an operating state in response to arrival of a time determined by the first time period, regardless of presence of a user operation at the operation receiving unit.

BRIEF DESCRIPTION OF THE DRAWINGS

An exemplary embodiment of the present disclosure will be described in detail based on the following figures, wherein:

FIG. 7 is a timing chart illustrating an example of operation control for facility devices provided in or on a shared facility.

DETAILED DESCRIPTION

An exemplary embodiment of the disclosure will be described below in detail with reference to the accompanying drawings.

(System Configuration)

Figure 1:
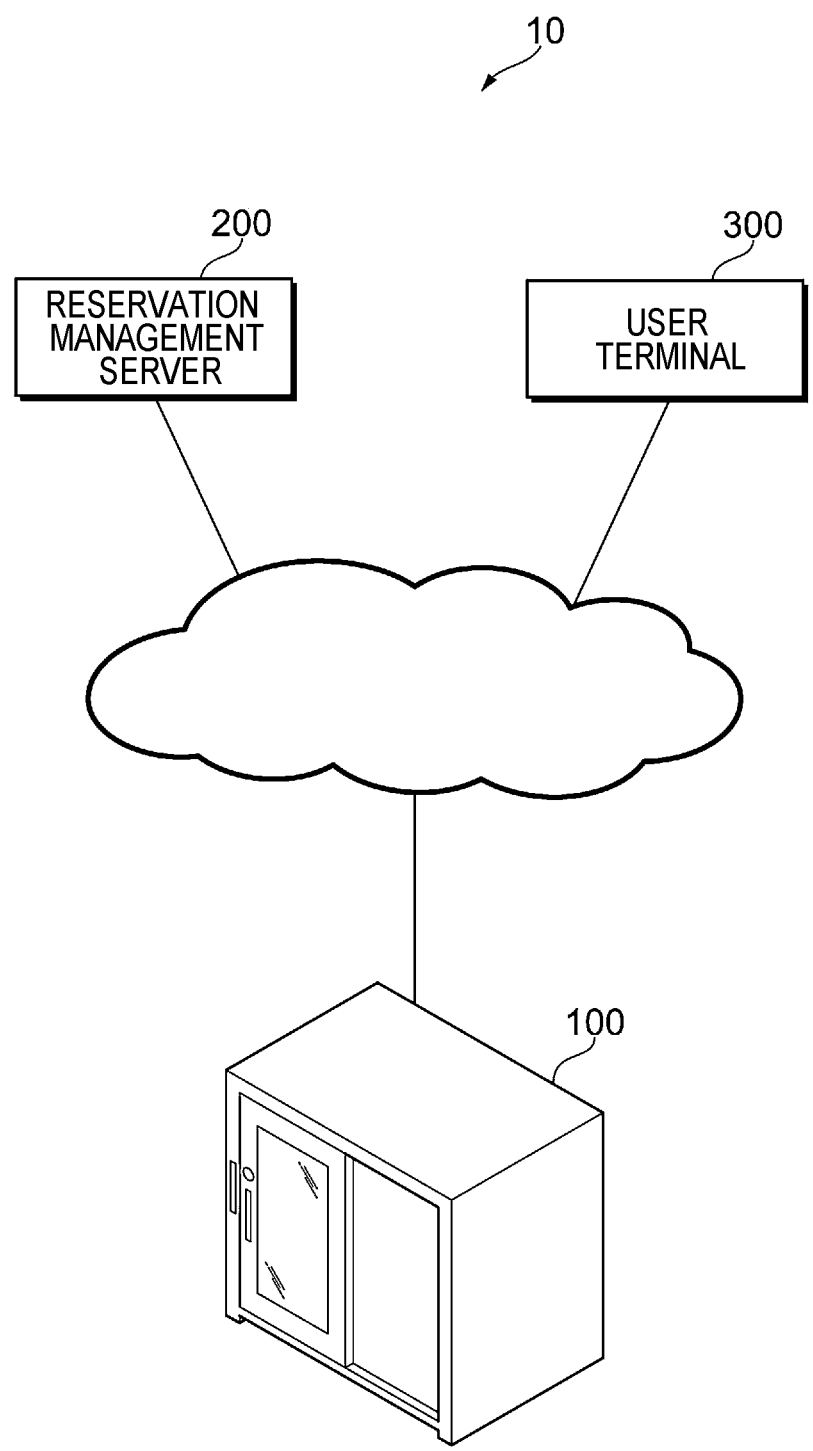
FIG. 1 is a schematic diagram illustrating the overall configuration of a service system to which the exemplary embodiment is applied.

FIG. 1 is a schematic diagram illustrating the overall configuration of a service system 10 to which the exemplary embodiment is applied. The service system 10 provides a service for the use of a shared space. This service allows multiple users to use a shared space 100, which is a specific location (space), by reservations. The service system 10 receives reservations for the shared space 100 and manages the use of the shared space 100 by users concerning the reservations. As shown in FIG. 1, the service system 10 includes the shared space 100, a reservation management server 200, and a user terminal 300. A communication device disposed in the shared space 100, the reservation management server 200, and the user terminal 300 are connected with each other via a network, such as the Internet. Although only the single shared space 100 is shown in FIG. 1, the service system 10 may include multiple shared spaces 100.

The shared space 100 is a space provided by the service system 10 and is a shared facility that can be used by multiple users. The service system 10 may provide an open space or a closed space as the shared space 100. The shared space 100 in the exemplary embodiment is a closed space, such as a room or a booth, enclosed by walls or partitions and allows a user to enter and leave the shared space 100 by opening a door. Facility devices, such as electrical devices and machines, which can be used by users, are installed within the shared space 100. The facility devices will be discussed later in detail. A control apparatus is also installed within the shared space 100 to control the shared space 100 and the operations of various facility devices installed in or on the shared space 100.

The organization which manages shared spaces 100 may be a single business operator or multiple business operators. For example, different business operators may share various management operations, such as reservation management, access control for the shared spaces 100 and management for the status of use, billing management for the use of the shared spaces 100, and membership management for registered users. Multiple shared spaces 100 do not have to be of the same type. For example, one shared space 100 may be used as a booth, while another shared space 100 may be used as part of a restaurant. Multiple business operators may conduct management for one purpose or one function collaboratively.

The reservation management server 200 receives reservations for the use of the shared space 100 and manages reservation information. The reservation information is information concerning users, locations, dates, and facility spaces, for example. The reservation management server 200 creates a reservation user interface (UI) screen for allowing a user to reserve a shared space 100 and causes the user terminal 300 to display the reservation UI screen. The reservation management server 200 also receives a reservation made by a user using the reservation UI screen.

The user terminal 300 is a terminal device used by a user to make a reservation for the shared space 100. As the user terminal 300, an information processing apparatus, such as a smartphone and a personal computer (PC), which can connect to a network to display the reservation UI screen is, used.

(External Configuration of Shared Space 100)

As discussed above, in the exemplary embodiment, the shared space 100 is a closed space separated from the outside by walls or partitions. More specifically, a booth set up in a certain space or a room provided in a building can be used as the shared space 100 in the exemplary embodiment. The external configuration of the shared space 100 will be discussed below, assuming that the shared space 100 is used as a booth set up in a certain space.

Figure 2:
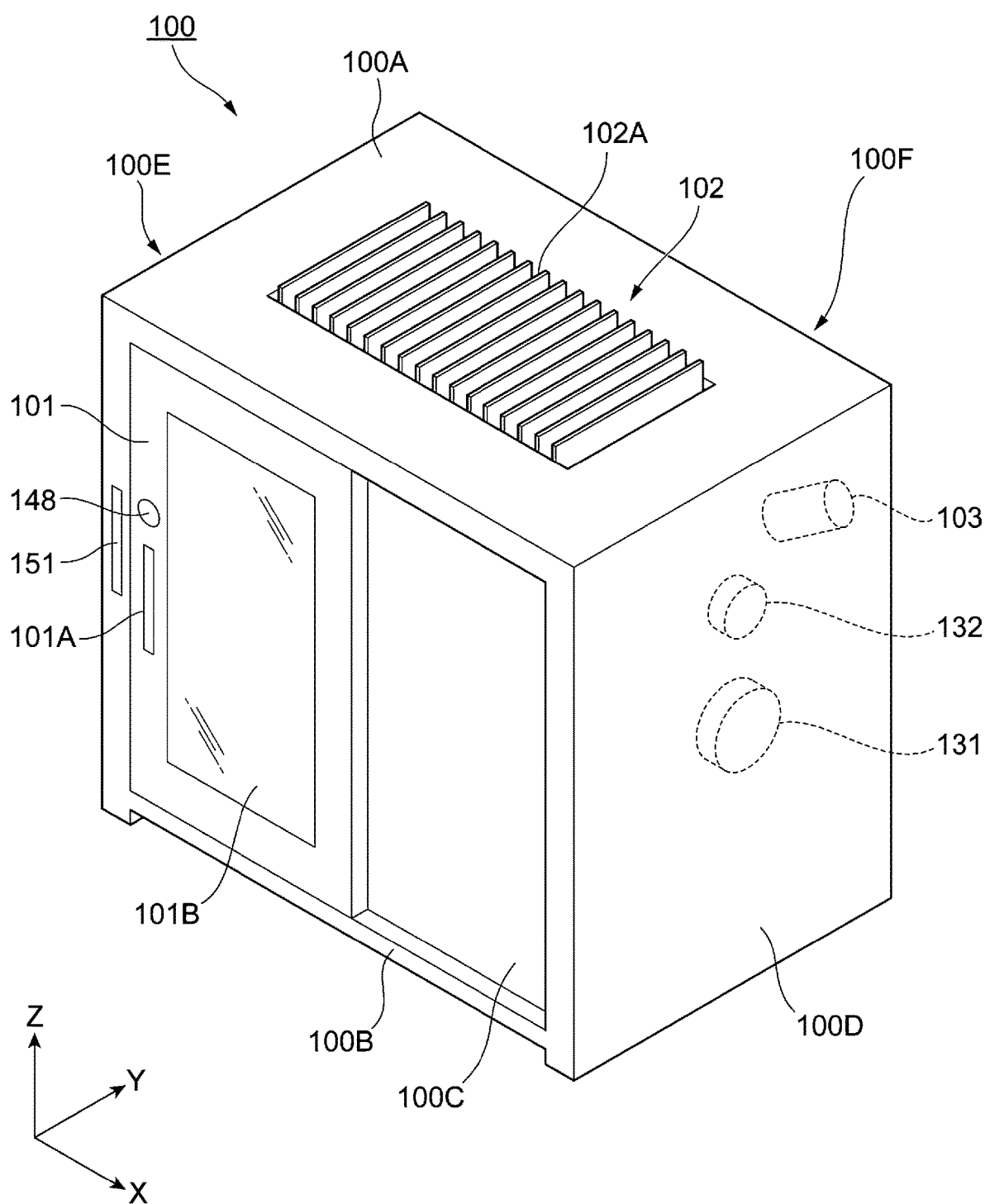
FIG. 2 is a perspective view illustrating an example of the external configuration of a shared space used as a booth.

FIG. 2 is a perspective view illustrating an example of the external configuration of the shared space 100 used as a booth. The skeleton of the shared space 100 is disposed in a location where many users can access, regardless of indoors and outdoors, such as in a station building, an airport, an office building, a commercial complex, for example, a restaurant or a department store, a bank, a library, an art gallery, a museum, a public institution or facility, a passageway, or a park.

In the example shown in FIG. 2, the shared space 100 is a closed booth having a ceiling. However, "closed" does not mean "sealed", and a closed booth may be any type of space having a practical soundproof function. Openings and gaps, such as vent holes and small windows, may be provided in part of the skeleton forming the shared space 100. The windows may be those that can be opened and closed.

The skeleton of the shared space 100 shown in FIG. 2 is constituted by a ceiling 100A, a floor 100B, a wall 100C having a door 101 fixed thereto, two walls 100D and 100E at both sides of the wall 100C, and a wall 100F opposite the wall 100C. In the example in FIG. 2, a ventilation opening 102 is provided on the ceiling 100A. A louver 102A is fixed to the ventilation opening 102. The angle of the slats of the louver 102A is adjustable to control the amount of light and air to let in the shared space 100. In FIG. 2, the louver 102A is fully open.

The door 101 is opened when a user enters or leaves the shared space 100 and is closed to separate the inside of the shared space 100 from the outside. The type of door, in other words, in which manner the door 101 is opened and closed, is not limited to a particular type. In the example in FIG. 2, the door 101 is a sliding door that can move along the wall 100C, and more particularly, a single sliding door in which one door member slides. The door 101 may alternatively be a sliding door in which two or more door members slide in opposite directions on different rails or a sliding door in which one door member slides to the left and the other door member slides to the right. The door 101 is not limited to a sliding door and may be a single hinged door that is opened and closed so as to draw an arc. Alternatively, the door 101 may be a double hinged door having two door members. In the case of a single or double hinged door, the door 101 may be an inward opening type or an outward opening type. The door 101 may be a folding door in which a pair of door members connected by a hinge opens to fold back. The folding door has a single type which opens to one side and a double type which opens to two sides. The door 101 may be a special door, such as a partition door or a pocket door which is withdrawn into a wall when it is not used.

A handle 101A is fixed to the door 101 for a user to hold when opening or closing the door 101. A blindfold plate 101B is provided at the central portion of the door 101. As the blindfold plate 101B, a member subjected to processing for enhancing the security and the confidentiality is used. For example, the blindfold plate 101B may be a transparent plate having a metal plate on which numerous holes are punched (such as a punching metal) fixed inside or a light-transmitting plate member subjected to processing for reducing the visibility, such as frosted glass.

An electronic lock 148 is fixed on the door 101. The electronic lock 148 includes a mechanism for electrically locking and unlocking the door 101. The electronic lock 148 is an example of a locking unit. The electronic lock 148 has a drive source, such as a motor, and a moving unit that is moved by the drive source. Part of the moving unit is fixed in the skeleton of the shared space 100 so as to prevent the door 101 from opening. The electronic lock 148 is not restricted to a particular type or a particular structure, and an existing electronic lock may be used.

Unlocking of the electronic lock 148 and the opening of the door 101 are operations performed by a user to enter or leave the shared space 100. In the exemplary embodiment, these operations are used as a trigger to use the shared space 100 and to start and stop operating various facility devices disposed in or on the shared space 100. Details of the operation control for the shared space 100 and various facility devices in response to the operations performed on the electronic lock 148 and the door 101 will be discussed later.

Within the skeleton of the shared space 100, one desk and one chair, which are not shown, are placed. On the desk, devices and machines installed in the shared space 100 in advance and those for which a user has asked when registering the shared space 100 are disposed. An image capturing unit 103 for taking an image of the inside of the shared space 100, a human sensor 131 for detecting a user within the skeleton, and a temperature/humidity sensor 132 for detecting the temperature and humidity in the shared space 100 are also provided within the skeleton of the shared space 100.

Outside the skeleton of the shared space 100, an information acquiring unit 151 for acquiring authentication information concerning a user using the shared space 100 is disposed. Various existing methods may be used to acquire information by using the information acquiring unit 151. The type of information acquiring unit 151 is determined by how information is acquired. For example, a card reader for reading an identification (ID) card or a sensor for reading biological information, such as user's fingerprints or finger vein patterns, may be used. Alternatively, the information acquiring unit 151 may connect to the user terminal 300 via wireless communication, such as Bluetooth (registered trademark) or near field communication (NFC), to acquire information.

The configuration and the structure of the skeleton forming the shared space 100 are not limited to those described above, and facility devices other than those described above may be installed in or on the shared space 100. For example, the configuration shown in FIG. 2 without the ceiling 100A may be used. The number of users using the shared space 100 is largely determined by the volume of the shared space 100. Basically, a private shared space 100 for one person is assumed for the configuration in FIG. 2. However, the shared space 100 may be a large room for accommodating a large group of people. A large room may be formed from one room, or multiple shared spaces 100 may be interconnected by removing one or both of the walls 100D and 100E of each shared space 100 so as to form a large room.

(Examples of Facility Devices in Shared Space 100)

Figure 3:
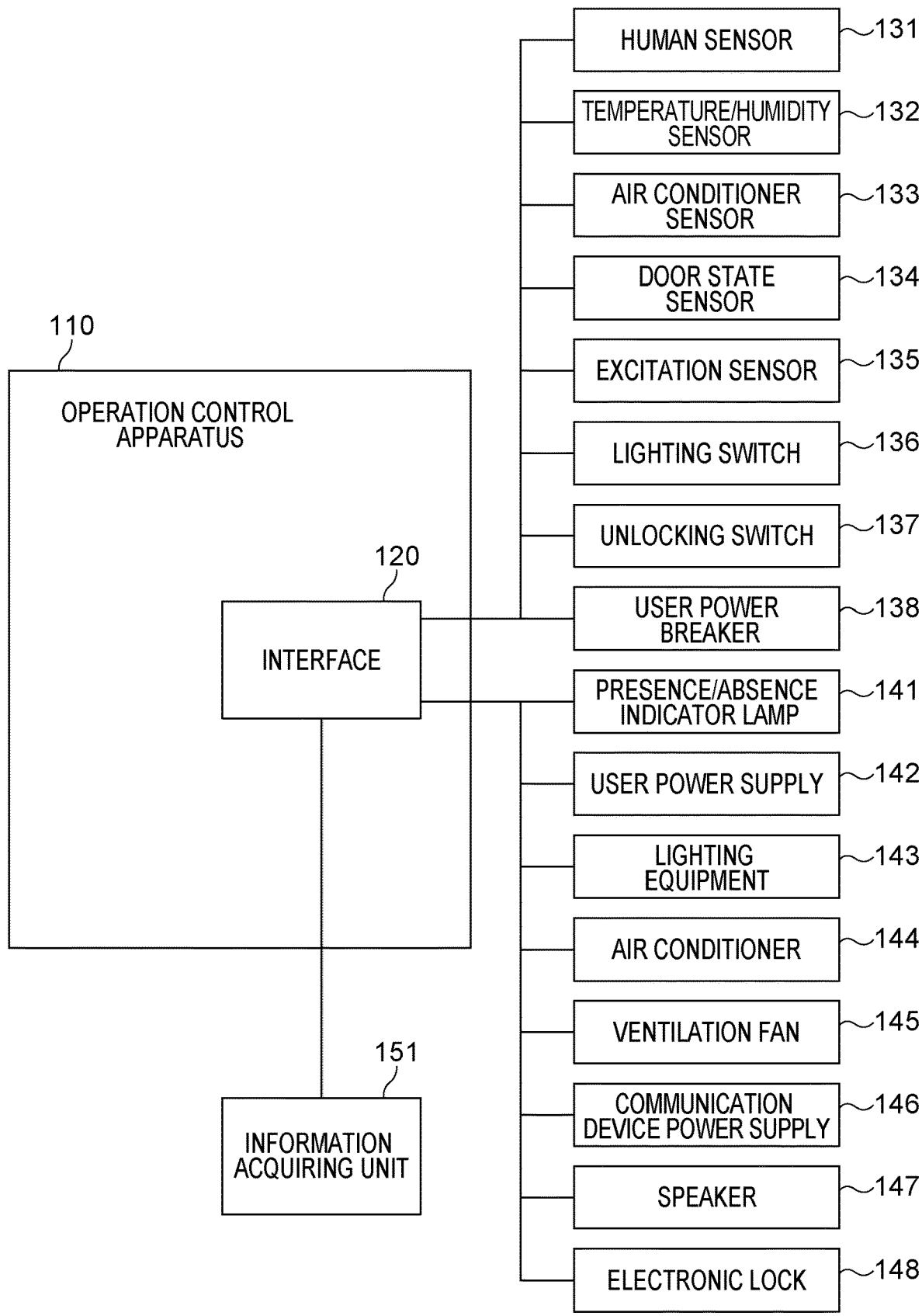
FIG. 3 illustrates examples of facility devices provided in or on a shared space.

FIG. 3 illustrates examples of facility devices disposed in or on the shared space 100. In the shared space 100, an operation control apparatus 110 is disposed. The operation control apparatus 110 is a device that controls the operations of the electrical devices and machines installed in the shared space 100. Operation control for the electrical devices and machines executed by the operation control apparatus 110 also includes converting of the input levels of various sensors, converting of the output levels of the electrical devices and machines to be controlled, and power supply control. The operation control apparatus 110 is linked with the reservation management server 200 to obtain information concerning a reservation and controls the electrical devices and machines in accordance with the content of the reservation. The operation control apparatus 110 is implemented by a computer.

The operation control apparatus 110 includes an interface 120 for allowing the operation control apparatus 110 to connect to various devices, machines, and sensors. The interface 120 connects to the electrical devices and machines and also to sensors so that the operation control apparatus 110 can obtain various items of information to execute control for the electrical devices and machines. The interface 120 includes hubs for inputting and outputting various signals.

The human sensor 131, the temperature/humidity sensor 132, an air conditioner sensor 133, a door state sensor 134, an excitation sensor 135, a lighting switch 136, an unlocking switch 137, and a user power breaker 138 are connected to the operation control apparatus 110 via the interface 120. Information detected by these sensors and switches is received by the operation control apparatus 110 via the interface 120.

The human sensor 131 is a sensor for detecting the movement of a user within the shared space 100. The temperature/humidity sensor 132 is a sensor for obtaining information concerning the temperature and the humidity in the shared space 100. The air conditioner sensor 133 is a sensor for detecting the ON/OFF state of an air conditioner installed in the shared space 100. The door state sensor 134 is a sensor for detecting whether the door 101 is open or closed. The excitation sensor 135 is a sensor for detecting whether an electromagnet for actuating the electronic lock 148 is excited to be magnetized (locking state) or is demagnetized (unlocking state). The lighting switch 136 is a switch for turning ON or OFF lighting equipment in the shared space 100 and can detect that the lighting switch 136 is manipulated. The unlocking switch 137 is a switch for unlocking the electronic lock 148 and can detect that the unlocking switch 137 is manipulated. The user power breaker 138 is a breaker for controlling the ON/OFF state of a user power supply and detects whether the user power supply is ON or OFF. The ON state is one example of an operating state. The OFF state is one example of a non-operating state. However, the terms "ON", "OFF", "operating", and "non-operating" do not intend to be limiting. For example, a state in which a device is usable or accessible by a user may be considered as an operating state as opposed to a non-operating state where the device is virtually unusable or inaccessible by the user. Furthermore, a device may have a stand-by mode and/or a sleep mode that may be considered as an operating state as opposed to a state that is less active, or may be considered as a non-operating state as opposed to a more active state.

A presence/absence indicator lamp 141, a user power supply 142, lighting equipment 143, an air conditioner 144, a ventilation fan 145, a communication device power supply 146, a speaker 147, and the electronic lock 148 are also connected to the operation control apparatus 110 via the interface 120. The ON/OFF operations of the devices and machines are controlled by a control command or a control signal sent from the operation control apparatus 110 via the interface 120.

The presence/absence indicator lamp 141 is a lamp for notifying a user outside the shared space 100 of whether there is someone within the shared space 100. The ON/OFF operations of the presence/absence indicator lamp 141 are controlled by the operation control apparatus 110. The user power supply 142 enables a user in the shared space 100 to use electrical devices of the user. The ON/OFF operations of the user power supply 142 are controlled by the operation control apparatus 110. The lighting equipment 143 is a lighting device fixed in the shared space 100, and the ON/OFF operations of the lighting equipment 143 are controlled by the operation control apparatus 110. The air conditioner 144 is installed in the shared space 100, and the ON/OFF operations of the air conditioner 144 are controlled by the operation control apparatus 110. The ventilation fan 145 exhausts air from the shared space 100 and lets fresh air in the shared space 100, and the ON/OFF operations of the ventilation fan 145 are controlled by the operation control apparatus 110. The communication device power supply 146 is the power supply of a communication device installed in the shared space 100, and the ON/OFF operations of the communication device power supply 146 are controlled by the operation control apparatus 110. The speaker 147 is audio equipment installed in the shared space 100, and the operation control apparatus 110 plays back a sound file to output voice announcement from the speaker 147. The electronic lock 148 is provided on the door 101, and the locking/unlocking operations of the electronic lock 148 are controlled by the operation control apparatus 110.

The information acquiring unit 151 is also connected to the operation control apparatus 110 via the interface 120. The information acquiring unit 151 sends authentication information concerning a user to the operation control apparatus 110 via the interface 120. The operation control apparatus 110 obtains reservation information concerning a reservation from the reservation management server 200 and conducts authentication to verify whether the user identified by the authentication information received from the information acquiring unit 151 is the user concerning this reservation. The information acquiring unit 151 and the operation control apparatus 110 are an example of an authenticator.

(Configuration of Operation Control Apparatus 110)

Figure 4:
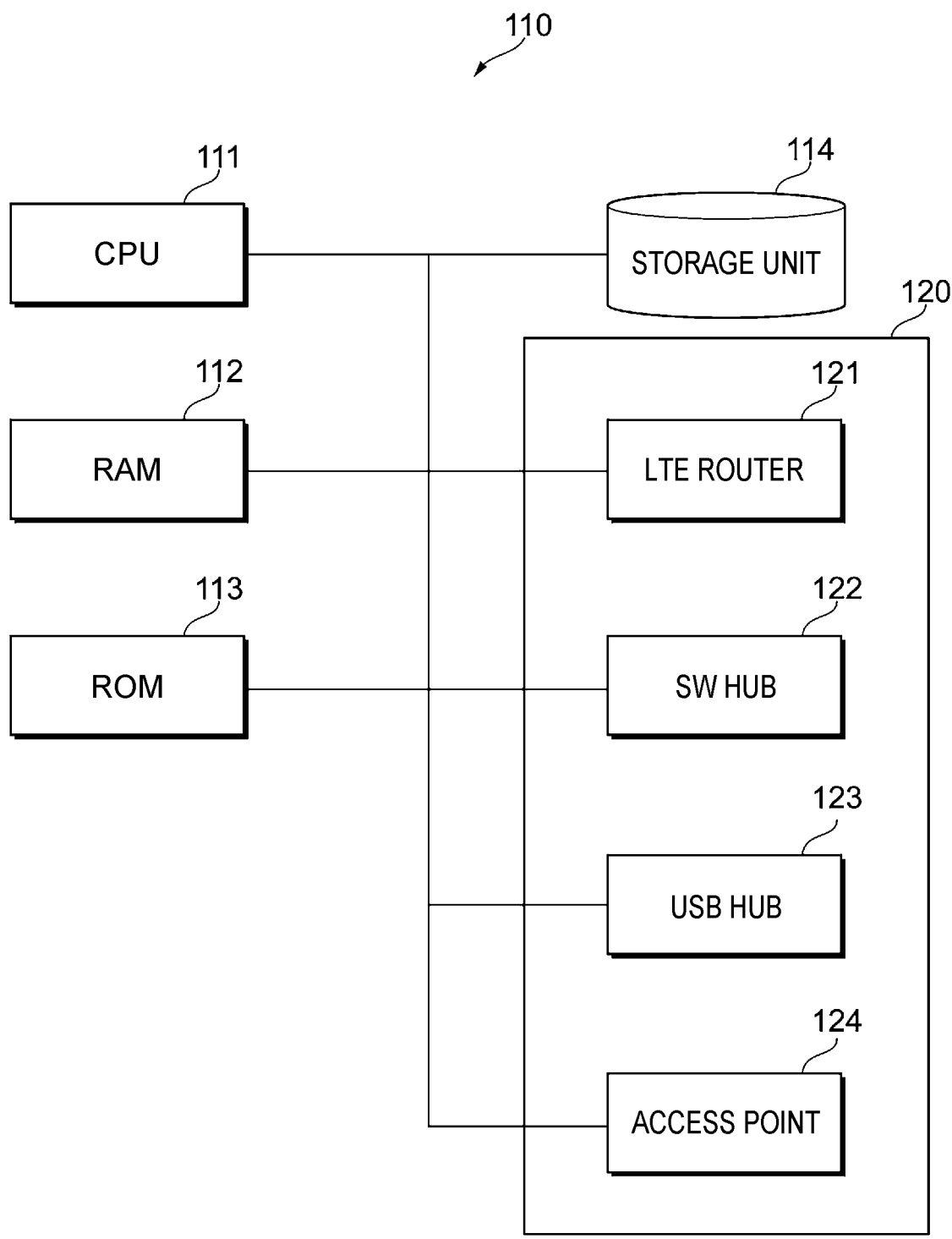
FIG. 4 is a block diagram illustrating an example of the configuration of an operation control apparatus.

FIG. 4 is a block diagram illustrating an example of the configuration of the operation control apparatus 110. A computer that implements the operation control apparatus 110 includes a central processing unit (CPU) 111, which is a processor, a random access memory (RAM) 112, which is a storage, a read only memory (ROM) 113, a storage unit 114, and the interface 120. The RAM 112 is a main storage unit (main memory) and is used as a work area for the CPU 111 to execute processing. The ROM 113 stores programs and data, such as set values. The CPU 111 can read a program and data directly from the ROM 113 and execute processing. The storage unit 114 is a storage for storing programs and data. The CPU 111 reads a program from the storage unit 114 into the main memory and executes it. The results of processing executed by the CPU 111 are also stored and retained in the storage unit 114. As the storage unit 114, a magnetic disk drive or a solid state drive (SSD), for example, is used.

The interface 120 includes a long term evolution (LTE) router 121, a switching (SW) hub 122, a universal serial bus (USB) hub 123, and an access point 124, as well as a connection medium to connect to the above-described various sensors, devices, and machines to be controlled. LTE and USB are registered trademarks. The LTE router 121 is a router for enabling the operation control apparatus 110 to connect to the Internet to exchange data with the reservation management server 200. The operation control apparatus 110 obtains reservation information concerning reservations for the shared space 100 from the reservation management server 200 via the LTE router 121. The interface 120 and the LTE router 121 are an example of an acquirer.

The SW hub 122 is used for maintaining the extensibility of the operation control apparatus 110 to connect to many devices and machines. The SW hub 122 intervenes between the LTE router 121 and the CPU 111 to connect them each other. The SW hub 122 is also used for connecting devices which are disposed in the shared space 100 but are managed and controlled from the outside, such as a security camera (not shown), to the LTE router 121.

The USB hub 123 is used for connecting devices which exchange data via a USB (USB devices) to the operation control apparatus 110. As an example of the USB device, the speaker 147, which outputs voice announcement under the control of the operation control apparatus 110, may be used as a USB device and be connected to the USB hub 123.

The access point 124 is a wireless communication device for exchanging data with an information processing apparatus, which is an example of the user terminal 300. An information processing apparatus, such as a laptop PC, of a user can be connected to the access point 124. This provides a user network environments where the user can connect to a network, such as the Internet, by using its own information processing apparatus. Users are unable to connect to the operation control apparatus 110 or the LTE router 121 via the access point 124. That is, the network of the service system 10 including the shared space 100 and the network provided by the access point 124 and used by users are separated from each other.

(Configuration of Reservation Management Server 200)

Figure 5:
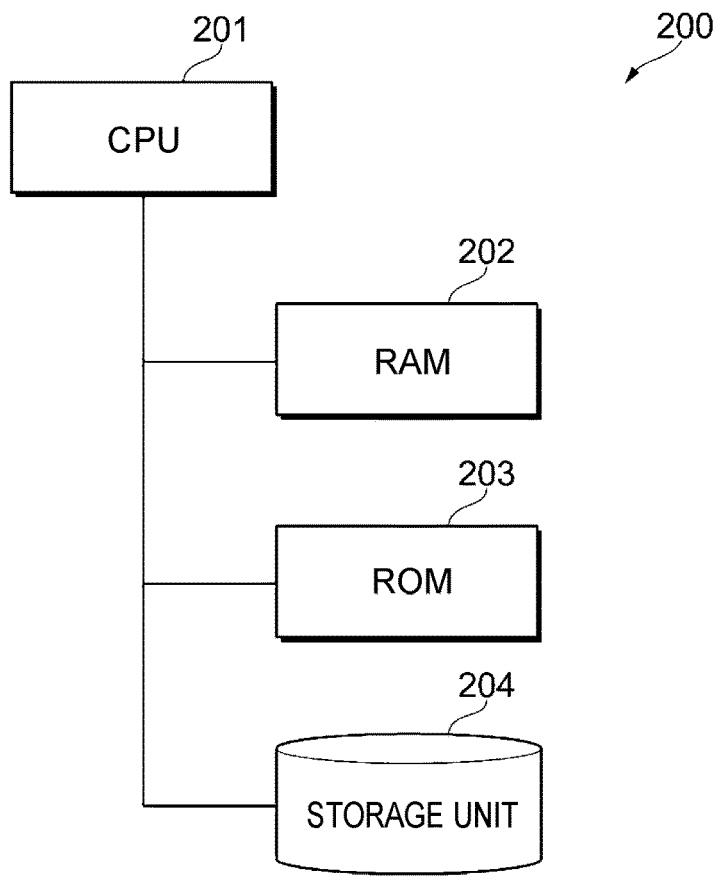
FIG. 5 is a block diagram illustrating an example of the configuration of a reservation management server.

FIG. 5 is a block diagram illustrating an example of the configuration of the reservation management server 200. The reservation management server 200 includes a CPU 201, which is a processor, a RAM 202, which is a storage, a ROM 203, and a storage unit 204. The RAM 202 is a main storage unit (main memory) and is used as a work area for the CPU 201 to execute processing. The ROM 203 stores programs and data, such as set values. The CPU 201 can read a program and data directly from the ROM 203 and execute processing. The storage unit 204 is a storage for storing programs and data. The CPU 201 reads a program from the storage unit 204 into the main memory and executes it. The results of processing executed by the CPU 201 are also stored and retained in the storage unit 204. As the storage unit 204, a magnetic disk drive or an SSD, for example, is used.

The reservation management server 200 receives reservations for each shared space 100 and manages reservation information. The reservation management server 200 includes a database, a reservation receiving function, and a notifying function, for example. The database is used for managing the reservation information concerning each shared space 100. The reservation receiving function is a function of receiving a reservation by exchanging data with the user terminal 300. The notifying function is a function of supplying information concerning the use of a shared space 100 to the shared space 100, based on the reservation information. The information concerning the use of a shared space 100 includes ID information of a user using the shared space 100 and the start time and the end time of the use of the shared space 100. If the reservation management server 200 is configured as shown in FIG. 5, the database is realized by the storage unit 204, while the reservation receiving function and the notifying function are implemented as a result of the CPU 201 executing a certain program. The reservation management server 200 is implemented by a server provided on a network. In this case, the functions of the reservation management server 200 may be implemented by a single server machine or by multiple servers. If the functions are distributed over multiple servers, the function of the database may be realized by a storage server, which is a separate server from the server for the other functions.

(Configuration of User Terminal 300)

Figure 6:
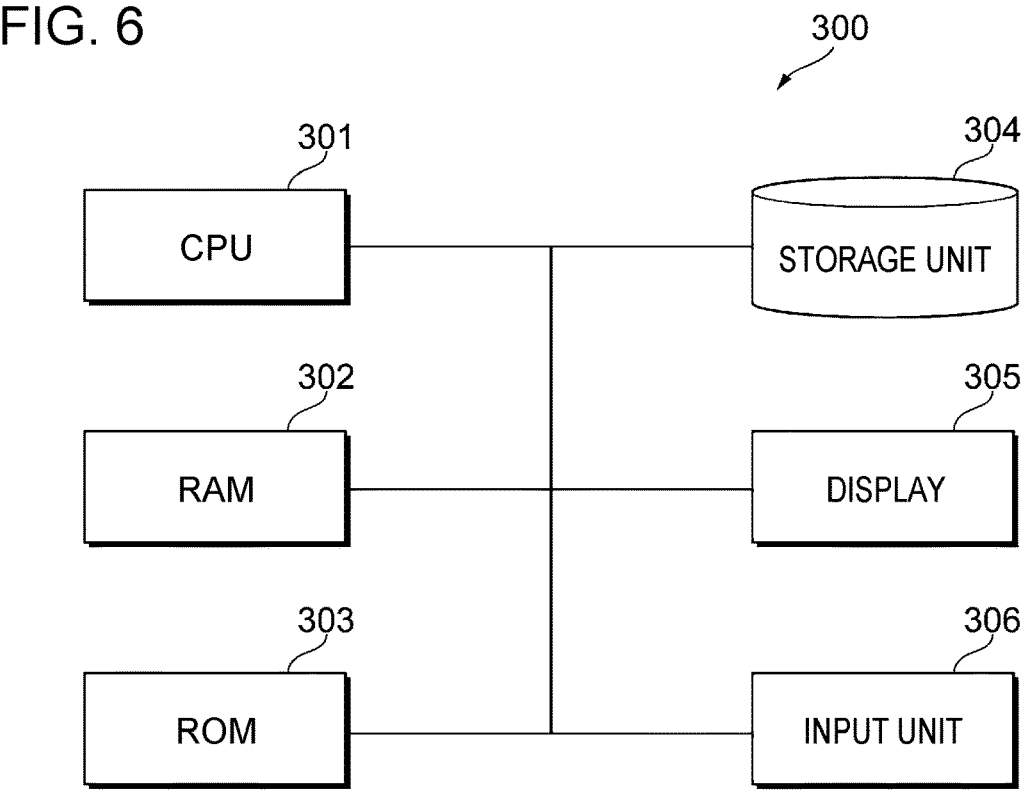
FIG. 6 is a block diagram illustrating an example of the configuration of a user terminal.

FIG. 6 is a block diagram illustrating an example of the configuration of the user terminal 300. The user terminal 300 includes a CPU 301, which is a processor, a RAM 302, which is a storage, a ROM 303, a storage unit 304, a display 305, and an input unit 306. The RAM 302 is a main storage unit (main memory) and is used as a work area for the CPU 301 to execute processing. The ROM 303 stores programs and data, such as set values. The CPU 301 can read a program and data directly from the ROM 303 and execute processing. The storage unit 304 is a storage for storing programs and data. The CPU 301 reads a program from the storage unit 304 into the main memory and executes it. The results of processing executed by the CPU 301 are also stored and retained in the storage unit 304. As the storage unit 304, a magnetic disk drive or an SSD, for example, is used.

The display 305 is a display unit that displays screens, such as an operation screen and an information presenting screen. The display 305 displays the reservation UI screen obtained from the reservation management server 200. As the display 305, a liquid crystal display, for example, is used. The input unit 306 is a unit that receives an input operation performed by a user. The input unit 306 receives an operation performed by a user in accordance with an operation screen, such as the reservation UI screen, displayed on the display 305. As the input unit 306, operation devices, such as a keyboard and a mouse, are used. A touch sensor may be used as the input unit 306 so as to form a touchscreen, which serves as a user interface, together with a liquid crystal display serving as the display 305.

(Operation Control by Operation Control Apparatus 110 for Facility Devices)

Based on the reservation information concerning a shared space 100 managed by the reservation management server 200, the operation control apparatus 110 disposed in this shared space 100 controls the operations of facility devices provided in the shared space 100. The facility devices include various types of devices, such as those operated only when someone is in the shared space 100 and those operated even when nobody is in the shared space 100. In terms of the convenience and the security, for example, operating conditions, such as the desirable operating time and the factor that triggers to start and stop operating installed devices, also vary in accordance with the types of devices.

As the operating conditions for the facility devices in the shared space 100, the start time and the end time of the use of the shared space 100 based on the reservation information, the timing at which the electronic lock 148 (see FIG. 3) is unlocked, the timing at which the door 101 (see FIG. 2) is opened, and the timings at which the start switches or the power switches of the individual facility devices are operated may be used. The facility devices in or on the shared space 100 will be divided into groups in accordance with the operating conditions, and then, operation control executed by the operation control apparatus 110 will be discussed below.

To use the shared space 100, a user is required to enter the shared space 100 by unlocking the electronic lock 148 and opening the door 101. Hence, for executing operation control for the facility devices in the shared space 100, unlocking the electronic lock 148 and the opening the door 101 can be a major factor. Operation control for the electronic lock 148 will first be discussed below.

Operation Control for Electronic Lock 148

In the exemplary embodiment, there are three different approaches to unlocking the electronic lock 148. In the first approach, the electronic lock 148 is unlocked on the condition that a user concerning a reservation for the shared space 100 is authenticated based on the reservation information. In the second approach, the electronic lock 148 is unlocked in response to the manipulation of the unlocking switch 137 (see FIG. 3) disposed in the shared space 100. In the third approach, the electronic lock 148 is unlocked in response to the manipulation of an external switch (not shown) provided outside the skeleton of the shared space 100. In the first and second approaches, the electronic lock 148 is unlocked under the control of the operation control apparatus 110. In the third approach, the electronic lock 148 is unlocked for a purpose which is not related to the use of the shared space 100, for example, for cleaning. In the case of the third approach, the electronic lock 148 may be unlocked under the control of the operation control apparatus 110 or another controller. The external switch is hidden within a box with a lock, and only the operator having the key for unlocking the box can use the external switch. The door 101 is equipped with an automatic locking mechanism, and when the door 101 is closed, the electronic lock 148 is automatically locked.

In the first approach, when a user concerning a certain reservation for the shared space 100 is authenticated during a period from a first time point to a second time point based on the reservation information, the electronic lock 148 is unlocked under the control of the operation control apparatus 110. The information acquiring unit 151 and the operation control apparatus 110, which form the authenticator, and the electronic lock 148 serve as a locking unit provided with an authentication function. The first time point is a time point earlier than the start time of the use of the facility devices in the shared space 100 according to the reservation by a predetermined allowance time. The allowance time can be determined in accordance with the management of the service system 10, and may be five minutes, for example. The time period after the first time point will be called a first time period. The second time point is a time point determined based on the end time of the use of the shared facility (facility devices) according to the reservation, and may be a time point later than the end time by a predetermined allowance time. After the second time point of a certain reservation, the electronic lock 148 is not unlocked by authentication of a user concerning this reservation. This allowance time can also be determined in accordance with the management of the service system 10, and may be five minutes, for example.

As an exception for operation control based on the first approach, operation control to be executed when two reservations are continuously made for the shared space 100 without a time interval therebetween will be explained. In this case, the user concerning the preceding reservation (also called the preceding user) is able to use the shared space 100 until the last minute before the user concerning the subsequent reservation (also called the subsequent user) enters the shared space 100. The subsequent user is able to start using the shared space 100 immediately after the preceding user has left the shared space 100. With the above-described allowance times, while the preceding user is still in the shared space 100, the electronic lock 148 can be unlocked by authentication of the subsequent user. What is more, even after the subsequent user has entered the shared space 100, the electronic lock 148 can be unlocked by authentication of the preceding user until the second time point. Accordingly, if two reservations are continuously made for the shared space 100 without a time interval therebetween, the operation control apparatus 110 ignores the allowance times and stops authenticating the user concerning the preceding reservation at the end time of the preceding reservation and starts authenticating the user concerning the subsequent reservation at the start time of the subsequent reservation.

In the second approach, when the unlocking switch 137 is manipulated in the shared space 100, the electronic lock 148 is unlocked under the control of the operation control apparatus 110. When the unlocking switch 137 is manipulated in the state in which the electronic lock 148 is unlocked, the electronic lock 148 is locked under the control of the operation control apparatus 110. In the second approach, reservation information is not taken into account to control the operation of the electronic lock 148.

Dividing of Facility Devices Based on Operating Conditions

Dividing of facility devices into some groups based on the operating conditions will be discussed below. In the exemplary embodiment, the facility devices are divided into a group which starts or stops operating when a condition based on reservation information is satisfied and when a user has performed a certain physical operation and into a group which starts or stops operating only when a condition based on reservation information is satisfied. The first group of facility devices will be called first facility devices, while the second group of facility devices will be called second facility devices. Not all the facility devices can be divided into one of the two groups, and some facility devices can be divided into neither of them. In the exemplary embodiment, however, operation control for facility devices that can be divided into one of the first and second facility devices will be described below.

Operation Control for First Facility Devices

The first facility devices start operating and become ready for use if a condition based on reservation information is satisfied and if a user has performed a certain physical operation. The condition based on reservation information is a condition concerning the time period for the use of facility devices according to the reservation (hereinafter such a time period will be called a reservation period). More specifically, in the exemplary embodiment, the condition based on reservation information is that the first facility devices can be operated during the above-described first time period. In the exemplary embodiment, opening the door 101, which is the operation that a user is required to perform to enter the shared space 100, is a user's physical operation used as a condition for operating the first facility devices. The operation for opening the door 101 is detected by the door state sensor 134 and is recognized by the operation control apparatus 110. In this sense, the door 101 is an example of an operation receiving unit, and the door state sensor 134 and the operation control apparatus 110 are an example of a recognizing unit.

To further develop the settings for operating the first facility devices in greater detail, the condition that the door 101 is opened for the first time during the operating hours of the shared space 100 and during the first time period concerning a reservation may be used as an operating condition for at least some of the first facility devices (first internal facility devices). In this case, after a user has opened the door 101 for the first time during the operating hours of the shared space 100, the first facility devices continue operating until a specific operation terminating condition is satisfied. The specific operation terminating condition may be a condition that the user has performed an operation to finish operating the facility devices or the operating hours of the shared space 100 have been completed. The specific operation terminating condition may vary in accordance with the type of first facility device.

The user using the shared space 100 for the first time during the operating hours of the shared space 100 is not necessarily a user concerning the first reservation for the shared space 100 (such a user will be called the first user). For example, the first user may not have used the shared space 100 (more specifically, the first user has not opened the door 101 by unlocking the electronic lock 148). In this case, if a user concerning the second reservation (such a user will be called the second user) unlocks the electronic lock 148 and opens the door 101 for the first time during the operating hours, this user is the user using the shared space 100 for the first time.

Examples of the first facility devices are the user power supply 142 and the lighting equipment 143 (see FIG. 3). Specific operation control for the first facility devices will be discussed below by taking the user power supply 142 as an example. After a user using the shared space 100 for the first time during the operating hours is authenticated, the electronic lock 148 is unlocked and the door 101 is opened. Upon the operation control apparatus 110 detecting this operation, the user power supply 142 is turned ON under the control of the operation control apparatus 110. At the end of the operating hours of the shared space 100, the user power supply 142 is turned OFF under the control of the operation control apparatus 110.

The lighting equipment 143 will be taken as another example to explain specific operation control for the first facility devices. After a user using the shared space 100 for the first time during the operating hours is authenticated, the electronic lock 148 is unlocked and the door 101 is opened. Upon the operation control apparatus 110 detecting this operation, the lighting equipment 143 is turned ON under the control of the operation control apparatus 110. When leaving the shared space 100, the user manipulates the lighting switch 136 and the operation control apparatus 110 detects this manipulating operation. The lighting equipment 143 is then turned OFF under the control of the operation control apparatus 110. The lighting equipment 143 is also turned OFF under the control of the operation control apparatus 110 at the end of the operating hours of the shared space 100. When the lighting switch 136 is manipulated in the state in which the lighting equipment 143 is OFF, the lighting equipment 143 is turned ON under the control of the operation control apparatus 110. After the lighting equipment 143 is turned ON as a result of the first user opening the door 101, it may automatically be turned ON regardless of the reservation information, namely, it is turned ON only on the condition that the door 101 is opened in the state in which the lighting equipment 143 is OFF. That is, if the lighting equipment 143 is OFF when the door 101 is opened, it is automatically turned ON.

Operation Control for Second Facility Devices

The second facility devices start operating and become ready for use if a condition based on reservation information is satisfied. As in the operating condition for the first facility devices, the condition based on reservation information is a condition concerning the reservation period. More specifically, in the exemplary embodiment, the condition based on reservation information is that the second facility devices can be operated from the start time until the end time of the use of the facility devices according to the reservation. This time period will be called a second time period.

An example of the second facility devices is the access point 124 (see FIG. 4) that provides a wireless communication network to a user. An example of specific operation control for the access point 124 will be discussed below. When the start time of the use of a shared facility indicated by the reservation information has arrived, the access point 124 starts operating and a communication network is connected under the control of the operation control apparatus 110. When the end time of the use of the shared facility indicated by the reservation information has arrived, the access point 124 stops operating and the communication network is disconnected under the control of the operation control apparatus 110. In other words, the access point 124 is operated in accordance with the reservation status, and the communication network is not available during the time period for which no reservations are made. To connect to the communication network provided by the access point 124, a service set identifier (SSID) and a password assigned to each user are used. The SSID and the password are registered in the reservation management server 200 as reservation information, for example, and the operation control apparatus 110 obtains the SSID and the password from the reservation management server 200 and uses them to conduct authentication when the user connects to the communication network.

If the communication network is not available, it means in this example that sending and receiving of radio waves to and from the access point 124 is blocked. When two reservations are continuously made for a shared facility without a time interval therebetween, the use of the shared facility according to the subsequent reservation starts right after the end of the use of the shared facility according to the preceding reservation. In this case, the operation control apparatus 110 blocks sending and receiving of radio waves to and from the access point 124 at the end of the use of the shared facility according to the preceding reservation. After the lapse of a certain period of time (several seconds, for example), the operation control apparatus 110 restarts sending and receiving of radio waves to and from the access point 124. The user using the shared facility is switched from the preceding user to the subsequent user at the timing at which sending and receiving of radio waves to and from the access point 124 is blocked. As a result, after sending and receiving of radio waves is restarted, the communication network is no longer available with the SSID and the password of the preceding user, but is available only with the SSID and the password of the subsequent user.

FIG. 7 is a timing chart illustrating an example of operation control for facility devices provided in or on a shared facility. In FIG. 7, the reservation status registered in the reservation management server 200, the timing at which the electronic lock 148 is unlocked, the timing at which the door 101 is opened, the ON/OFF state of the user power supply 142, the ON/OFF state of the lighting equipment 143, and the ON/OFF state of a communication network provided by the access point 124 are shown. The user power supply 142 is in the ON state from the time point "ON" to the time point "OFF" and is in the OFF state in the other periods. The lighting equipment 143 is in the ON state from the time point "ON" to the time point "OFF" and is in the OFF state during the other periods. The communication network is available from the time point "ON" to the time point "OFF" and is unavailable during the other periods.

In the example in FIG. 7, the shared space 100 can be used from the start time to the end time during the operating hours in accordance with reservations registered in the reservation management server 200. In the example in FIG. 7, four reservations, first through fourth reservations, are registered. The first reservation starts at time T1 and ends at time T2. The second reservation starts at time T3 and ends at time T4. The third reservation starts at time T5 and ends at time T6. The fourth reservation starts at time T6 and ends at time T7. The third and fourth reservations are continuous without a time interval therebetween.

In FIG. 7, a time gap tg1 is an allowance time which is set prior to the start time of the use of the shared space 100 according to each reservation. In the above-described example of operation control for the electronic lock 148, regarding the first reservation, a user concerning the first reservation can unlock the electronic lock 148 by conducting authentication from the time point earlier than time T1 by the time gap tg1. A time gap tg2 is an allowance time which is set subsequent to the end time of the use of the shared space 100 according to each reservation. In the above-described example of operation control for the electronic lock 148, regarding the first reservation, the user concerning the first reservation can unlock the electronic lock 148 by conducting authentication until the time point later than time T2 by the time gap tg2.

Operation control based on the first reservation will be described below. The first reservation is the reservation made for the first time after the start of the operating hours. At the time point (the start of the first time period) earlier than time T1, which is the start time of the use of the shared space 100 (facility devices) based on the first reservation, by the time gap tg1, the user concerning the first reservation (also called the first user) unlocks the electronic lock 148 and opens the door 101 by conducting authentication and enters the shared space 100. At the timing at which the door 101 is opened, the user power supply 142 is powered ON and the lighting equipment 143 is turned ON under the control of the operation control apparatus 110. Then, at time T1 (the start of the second time period), the communication network is connected and becomes available under the control of the operation control apparatus 110.

At time T2, the first user unlocks the electronic lock 148, closes the door 101, and leaves the shared space 100. At time T2, the first user is in the shared space 100 and thus unlocks the electronic lock 148 by manipulating the unlocking switch 137 disposed in the shared space 100, instead of conducting authentication. When leaving the shared space 100, the first user also manipulates the lighting switch 136 to turn OFF the lighting equipment 143. At time T2 (the end of the second time period), which is the end time of the use of the shared space 100 based on the first reservation, the communication network is disconnected (OFF) and becomes unavailable under the control of the operation control apparatus 110.

Operation control based on the second reservation will be described below. The second reservation is the reservation to be started after the end time of the use of the shared space 100 according to the first reservation with a certain time interval. At a time point (during the first time period) later than time T3, which is the start time of the use of the shared space 100 based on the second reservation, a user concerning the second reservation (also called the second user) unlocks the electronic lock 148 and opens the door 101 by conducting authentication and enters the shared space 100. At the timing at which the door 101 is opened, the lighting equipment 143 is turned ON. At time T3 (the start of the second time period), regardless of whether the second user has entered the shared space 100, the communication network is connected and becomes available under the control of the operation control apparatus 110.

Before the end time of the use of the shared space 100 based on the second reservation, the second user unlocks the electronic lock 148, closes the door 101, and leaves the shared space 100. In this case, the second user unlocks the electronic lock 148 by manipulating the unlocking switch 137 disposed in the shared space 100. The second user leaves the shared space 100 without manipulating the lighting switch 136, and the lighting equipment 143 accordingly remains ON. At time T4, which is the end time of the use of the shared space 100 based on the second reservation (the end of the second time period), the communication network is disconnected (OFF) and becomes unavailable under the control of the operation control apparatus 110.

Operation control based on the third reservation will be described below. The third reservation is the reservation to be started after the end time of the use of the shared space 100 according to the second reservation with a certain time interval. At a time point (the start of the first time period) earlier than time T5, which is the start time of the use of the shared space 100 based on the third reservation, by the time gap tg1, a user concerning the third reservation (also called the third user) unlocks the electronic lock 148 and opens the door 101 by authentication and enters the shared space 100. At this time, the user power supply 142 and the lighting equipment 143 are ON, and operation control is not performed to start the user power supply 142 and the lighting equipment 143 in response to the opening of the door 101. Then, at time T5 (the start of the second time period), the communication network is connected and becomes available under the control of the operation control apparatus 110.

At time T6, which is the end time of the use of the shared space 100 based on the third reservation, the third user unlocks the electronic lock 148, closes the door 101, and leaves the shared space 100. In this case, the third user unlocks the electronic lock 148 by manipulating the unlocking switch 137 disposed in the shared space 100. The third user leaves the shared space 100 without turning OFF the lighting equipment 143. At time T6 (the end of the second time period), the communication network is disconnected (OFF) and becomes unavailable under the control of the operation control apparatus 110.

Operation control based on the fourth reservation will be described below. The fourth reservation is the reservation to be started immediately after the end time of the use of the shared space 100 according to the third reservation. The third user has left the shared space 100 without turning OFF the lighting equipment 143, and the lighting equipment 143 accordingly remains ON. At time T6 (the end of the second time period of the third reservation and the start of the second time period of the fourth reservation), the communication network is disconnected (OFF) and is connected (ON) again under the control of the operation control apparatus 110.

The end of the use of the shared space 100 (facility devices) based on the third reservation and the start of the use of the shared space 100 based on the fourth reservation both coincide with time T6. When the third user opens the door 101 to leave the shared space 100, the fourth user could enter the shared space 100. In this case, it is possible that the fourth user enter the shared space 100 without unlocking the electronic lock 148 by conducting authentication. To deal with such a situation, an authenticator may also be provided in the shared space 100, and at time T6, which is the start time of the use of the shared space 100 based on the fourth reservation, the fourth user may be requested to conduct authentication by using this authenticator if it has not conducted authentication for unlocking the electronic lock 148 at time T6. Alternatively, the image capturing unit 103 may take an image of the third user during the use of the shared space 100 according to the third reservation and that of the fourth user during the use of the shared space 100 according to the fourth reservation. Then, the two images are compared with each other to check whether the user using the shared space 100 has changed. This operation will be described later in detail.

At time T7, which is the end time of the use of the shared space 100 (facility devices) based on the fourth reservation, the fourth user unlocks the electronic lock 148, closes the door 101, and leaves the shared space 100. In this case, the fourth user unlocks the electronic lock 148 by manipulating the unlocking switch 137 disposed in the shared space 100. The fourth user leaves the shared space 100 without turning OFF the lighting equipment 143. At time T7 (the end of the second time period), the communication network is disconnected (OFF) and becomes unavailable under the control of the operation control apparatus 110.

Thereafter, no reservations are made for the shared space 100. At the end of the operating hours of the shared space 100, the user power supply 142 is powered OFF and the lighting equipment 143 is turned OFF under the control of the operation control apparatus 110.

In the above-described examples of operation control, the user power supply 142 and the lighting equipment 143 are used as specific examples of the first facility devices, while the communication network provided by the access point 124 is used as a specific example of the second facility devices. These facility devices are only examples, and operation control can be performed for various electrical devices and machines installed in the shared space 100 as a first facility device or a second facility device. For example, operation control may be performed for the air conditioner 144 and the ventilation fan 145 (see FIG. 3) as first facility devices and for the speaker 147 (see FIG. 3) as a second facility device. Whether the electrical devices and machines are each grouped as a first facility device or a second facility device may be individually determined in accordance with the specification and management of the service system 10.

(Control Based on Comparison between User Images)

In the exemplary embodiment, by allocating time periods to individual users by reservations, the shared space 100 and facility devices installed in the shared space 100 are made available among multiple users. As in the above-described case in which two reservations are continuously made without a time interval therebetween, a user could enter the shared space 100 without unlocking the electrical lock 148 by authentication. Additionally, when a user having entered the shared space 100 by authentication manipulates the unlocking switch 137 and opens the door 101, another user could enter the shared space 100. To address these issues, multiple authentication methods may be combined to enhance the authentication quality. Authentication may be made as follows, for example. With the use of the image capturing unit 103, images (such as face images) of users in different time periods are taken and are compared with each other. Such images will be hereinafter called user images. User images may be compared with each other by the operation control apparatus 110, for example. In this sense, the operation control apparatus 110 is an example of a comparison unit.

Comparison of user images is conducted by using an image recognition technique. However, analyzing user images and identifying users in the analyzed images is not assumed here. Determining whether or not users in user images are the same user is sufficient. Registering of users to be authenticated is not necessary, and multiple user images are simply compared with each other. Existing techniques may be employed to recognize images and compare them with each other.

A specific example of authentication using user images will be discussed below. In a first authentication example, user images are taken at different time points of a single reservation period and are then compared with each other. In this case, users in the user images taken during the single reservation period should be the same user. As a result of comparison, if the users in the multiple user images are found to be the same user, the authentication result obtained by this comparison is consistent with that by the information acquiring unit 151 and the operation control apparatus 110. In contrast, as a result of comparison, if the users in the multiple user images are found to be different users, the authentication result obtained by this comparison is not consistent with that by the information acquiring unit 151 and the operation control apparatus 110. If the authentication results are not consistent with each other, the users may have been dishonestly replaced during the single reservation period. This means that a certain user does not undergo authentication based on reservation information and authentication information acquired by the information acquiring unit 151.

In a second authentication example, user images are taken during different reservation periods according to reservations made by different users and are then compared with each other. In this case, users in the user images taken during the different reservation periods should be different users. As a result of comparison, if the users in the multiple user images are found to be different users, the authentication result obtained by this comparison is consistent with that by the information acquiring unit 151 and the operation control apparatus 110. In contrast, as a result of comparison, if the users in the plural user images are found to be the same user, the authentication result obtained by this comparison is not consistent with that by the information acquiring unit 151 and the operation control apparatus 110. If the authentication results are not consistent with each other, the users may have been dishonestly replaced during the different reservation periods.

Authentication to be conducted in a specific case in the second authentication example will be explained. An example of the specific case is a case in which two reservations are continuously made for a shared space 100 without a time interval therebetween, and the information acquiring unit 151 and the operation control apparatus 110 have not authenticated the user concerning the subsequent reservation (also called the subsequent user). In this case, since the information acquiring unit 151 and the operation control apparatus 110 have not authenticated the subsequent user, this user has not entered the shared space 100 in theory. At the end of the reservation period of the preceding reservation, the user concerning the preceding reservation (also called the preceding user) has already left the shared space 100 in theory. If the subsequent user has not arrived yet, however, the preceding user may still be in the shared space 100. This does not mean that the preceding user remains in the shared space 100 dishonestly, though the second facility devices are no longer available for the preceding user because the reservation period of the preceding reservation has elapsed. To handle this situation, a user image obtained during the preceding reservation period and that during the subsequent reservation period are compared with each other. If the users in the user images are found to be different users, it is judged that the authentication result obtained by this comparison is not consistent with that by the information acquiring unit 151 and the operation control apparatus 110.

In this case, the operation control apparatus 110 controls operations of at least some of the facility devices differently from regular control to be executed when the above-described authentication results are consistent with each other. More specifically, for example, the operation control apparatus 110 outputs a message to a monitor (not shown) controlled by the operation control apparatus 110 or to the speaker 147 by voice to instruct the second user to conduct authentication. The operation control apparatus 110 may stop operating some of the facility devices, such as the user power supply 142 and the communication network provided by the access point 124. In other words, the operation control apparatus 110 may stop operating a first device, a second device, or a third device from among the facility devices disposed in the shared space 100.

The disclosure has been described through illustration of the exemplary embodiment. The technical scope of the disclosure is not limited to the above-described exemplary embodiment. For example, in the above-described exemplary embodiment, different reservations are made by different users. It is possible, however, that the same user make multiple reservations in consecutive time periods. In this case, the operation control apparatus 110 may execute operation control differently from regular operation control. For example, the operation control apparatus 110 may execute control such that authentication using the information acquiring unit 151 and the operation control apparatus 110 serving as the authenticator can be omitted from the second reservation onwards and such that facility devices will not discontinue operating between the reservations.

In the above-described exemplary embodiment, to disconnect the communication network provided by the access point 124, sending and receiving of radio waves to and from the access point 124 is blocked. Instead of blocking radio waves, the SSID may be changed to prevent the continuous use of the communication network by the same user.

In the above-described exemplary embodiment, the operation control apparatus 110 authenticates a user by using authentication information obtained by the information acquiring unit 151. Alternatively, authentication processing may be delegated to an external authentication server.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A system comprising:
   an operation receiving unit that is operated by a user; and
   an operation control apparatus that controls a first device at a facility to enter into an operating state in response to a user operation being performed at the operation receiving unit during a first time period determined by reservation information, and controls a second device at the facility to enter into an operating state at a start time associated with the first time period, regardless of presence of a user operation at the operation receiving unit.

2. The system according to claim 1, wherein the reservation information is information on a reservation of the facility.

3. The system according to claim 1, wherein the facility has a door that serves as an entrance to the facility, and the operation receiving unit is the door.

4. The system according to claim 3, further comprising:
   a locking unit that unlocks, based on first authentication of a first user for whom the facility is reserved for the first time period, the door during a first unlockable time window from a first time point that is earlier than a start time of the first time period by a predetermined allowance time and to a second time point determined based on an end time of the first time period.

5. The system according to claim 4,
   wherein the locking unit unlocks, based on second authentication of a second user for whom the facility is reserved for a second time period, the door for the second user, and wherein, in a case where the second time period is consecutive to the first time period,
the first unlockable time window for the first user ends at the end time of the first time period instead of at the second time point, and
a second unlockable time window for the second user begins at a start time of the second time period.

6. The system according to claim 1,
wherein the first device includes a lighting device, and
wherein the second device is a communication network.

7. The system according to claim 6,
wherein the controlling of the first device by the operation control apparatus to enter into the operating state includes controlling the lighting device to turn on.

8. The system according to claim 6, wherein the operation control apparatus controls the communication network to become accessible by a first user for whom the facility is reserved for the first time period and controls the communication network to become inaccessible by the first user at an end time of the first time period.

9. The system according to claim 1, further comprising:
an image capturing unit disposed at the facility,
wherein the operation control apparatus performs control of a third device at the facility in accordance with a result of comparison of a plurality of user images of different moments captured by the image capturing unit.

10. The system according to claim 9,
wherein the third device is the first device or the second device.

11. The system according to claim 9, further comprising:
an authenticator configured to:
authenticate a first user during a first authentication time window that is from a first time point to a second time point, the first time point being earlier than a start time of the first time period by a predetermined allowance time, the second time point being determined based on an end time of the first time period, and
wherein, in a case where a second time period consecutive to the first time period is reserved for a second user and the authenticator has not authenticated the second user by a start time of the second time period, the operation control apparatus controls a third device at the facility to execute a first function upon a determination that a first user image captured by the image capturing unit during the first time period and a second user image captured by the image capturing unit during the second time period contain different users.

12. The system according to claim 1, further comprising:
an image capturing unit disposed at the facility; and
an authenticator that authenticates a first user, for whom the facility is reserved for the first time period, during a first authentication time window that is from a first time point to a second time point, the first time point being earlier than a start time of the first time period by a predetermined time, the second time point being determined by an end time of the first time period,
wherein the operation control apparatus controls a third device at the facility in a first manner upon a determination that a comparison result of a plurality of user images of different moments captured by the image capturing unit is consistent with an authentication result, and controls the third device at the facility in a second manner upon a determination that the comparison result of the plurality of user images is inconsistent with the authentication result.

13. The system according to claim 12,
wherein the third device is the first device or the second device.

14. A facility which is separated from outside, comprising:
a door;
a recognizing unit that recognizes the door being operated;
a locking unit that unlocks the door during a first unlockable time window based on first authentication of a first user for whom the facility is reserved for a first time period, the first unlockable time window beginning at a first time point that is earlier than a start time of the first time period by a predetermined allowance time and expiring at a second time point determined based on an end time of the first time period;
a first device disposed inside the facility that enters into an operating state in response to the door being opened for the first time in operating hours of the facility; and
a second device disposed inside the facility that enters into an operating state at the start time of the first time period and exits the operating state in which the second device has been in at an end time of the first time period.

15. The facility according to claim 14, wherein the second time point is a time point later than the end time of the first time period.

16. The facility according to claim 15,
wherein the locking unit unlocks the door during a second unlockable time window based on second authentication of a second user for whom the facility is reserved for a second time period, and
wherein, in a case where the second time period is consecutive to the first time period,
the first unlockable time window expires at the end time of the first time period instead of at the second time point, and
the second unlockable time window begins at a start time of the second time period.

17. The facility according to claim 14,
wherein the first device includes a power supply device and a lighting device, and
wherein the second device includes a communication network.

18. The facility according to claim 17,
wherein the lighting device turns on in response to the door being opened.

19. The facility according to claim 14, further comprising:
an image capturing unit that captures user images at different times,
wherein at least one of the first device and the second device operates in a first manner upon a determination that a comparison result of the user images captured by the image capturing unit is consistent with an authentication result of the first user, and the at least one of the first device and the second device operates in a second manner upon a determination that the comparison result of the user images captured by the image capturing unit is inconsistent with the authentication result.

20. A system comprising:
operation receiving means being operated by a user; and
operation control means for controlling a first device at a facility to enter into an operating state in response to a user operation being performed at the operation receiving means during a first time period determined by reservation information and for controlling a second device at the facility to enter into an operating state at a start time associated with the first time period, regardless of presence of a user operation at the operation receiving means.

\* \* \* \* \*